United States Patent
Choi et al.

(10) Patent No.: US 7,480,078 B2
(45) Date of Patent: Jan. 20, 2009

(54) METHOD AND SYSTEM FOR PERFORMING MULTI-PIXEL PARALLEL ERROR DIFFUSION ENABLING HIGH-SPEED DIFFUSION PROCESSING WITHOUT INCREASING THE SYSTEM CLOCK RATE

(75) Inventors: Yungran Choi, Webster, NY (US); Xing Li, Webster, NY (US); Daniel A. Mohabir, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 667 days.

(21) Appl. No.: 11/116,894

(22) Filed: Apr. 28, 2005

(65) Prior Publication Data

US 2006/0245000 A1 Nov. 2, 2006

(51) Int. Cl.
*H04N 1/40* (2006.01)
(52) U.S. Cl. .................. 358/3.03; 358/3.04; 358/3.05; 358/3.21; 358/3.22; 358/534; 358/466; 382/252; 382/270
(58) Field of Classification Search ........ 358/3.03–3.05, 358/534, 466, 465, 447; 382/252, 270, 237
See application file for complete search history.

(56) References Cited

U.S. PATENT DOCUMENTS

| | | | |
|---|---|---|---|
| 5,226,094 A | | 7/1993 | Eschbach |
| 5,374,997 A | | 12/1994 | Eschbach |
| 5,739,917 A | * | 4/1998 | Shu et al. ............... 358/2.1 |
| 5,809,177 A | * | 9/1998 | Metcalfe et al. ............ 382/251 |
| 5,870,503 A | * | 2/1999 | Kumashiro ............ 382/252 |
| 5,973,803 A | * | 10/1999 | Cheung et al. .......... 358/534 |
| 5,974,228 A | * | 10/1999 | Heitsch ................. 358/1.9 |
| 6,055,336 A | * | 4/2000 | Niki ....................... 382/237 |
| 6,671,071 B1 | * | 12/2003 | Kletter ................... 358/1.9 |
| 6,920,243 B2 | * | 7/2005 | Damera-Venkata ...... 382/162 |
| 7,002,708 B2 | * | 2/2006 | Damera-Venkata ...... 358/1.9 |
| 2002/0186267 A1 | * | 12/2002 | Velde et al. ............... 347/15 |
| 2003/0112468 A1 | * | 6/2003 | Eschbach et al. ........ 358/3.03 |
| 2004/0207879 A1 | * | 10/2004 | Bailey et al. ........... 358/3.03 |
| 2005/0025374 A1 | * | 2/2005 | Ishikawa ................ 382/252 |
| 2005/0237575 A1 | * | 10/2005 | Yamazaki .............. 358/3.03 |

FOREIGN PATENT DOCUMENTS

EP 658044 A2 * 6/1995

OTHER PUBLICATIONS

Agar et al., "Model-based color halftoning using direct binary search", Dec. 2005, IEEE transactions on image processing, vol. 14, Isue 12, pp. 1945-1959.*
Robert W. Floyd et al., "An Adaptive Algorithm for Spatial Greyscale", 3 pp.

* cited by examiner

*Primary Examiner*—Mark K Zimmerman
*Assistant Examiner*—Javier J Ramos
(74) *Attorney, Agent, or Firm*—Pepper Hamilton LLP

(57) ABSTRACT

A method and system for performing error diffusion are disclosed. An ordered set of pixels, including a pixel intensity value for each pixel, is received. Each pixel intensity value includes a value within a range from a low value to a high value, inclusive. An initial error value is also received. Based on the pixel intensity values and the initial error value, a pixel value for each pixel and an updated error value are computed substantially simultaneously with each other.

10 Claims, 11 Drawing Sheets

METHOD AND SYSTEM FOR PERFORMING MULTI-PIXEL PARALLEL ERROR DIFFUSION ENABLING HIGH-SPEED DIFFUSION PROCESSING WITHOUT INCREASING THE SYSTEM CLOCK RATE

TECHNICAL FIELD

The disclosed embodiments generally relate to the field of image processing and printing. More particularly, the disclosed embodiments relate to a method and system for multi-pixel parallel error diffusion in connection with the processing or printing of text, graphics or other images.

BACKGROUND

Error diffusion methods, such as the method described in R. W. Floyd & L. Steinberg, "An Adaptive Algorithm for Spatial Grayscale," in Proceedings of the Society for Information Display, vol. 17, pp 75-77 (1976) (the "Floyd-Steinberg method"), are often used to convert grayscale images to binary images. Such error diffusion methods typically examine a pixel in an input image, determine whether the intensity for the pixel in the input image exceeds a threshold, and assign either a light or dark binary value to the pixel in an output image based on whether it exceeds the threshold. The difference between the input image pixel intensity and the corresponding pixel intensity in the output image is the error for the pixel. Error diffusion methods assign at least a portion of the error to each of one or more neighboring pixels that have not been previously assigned a pixel intensity for the output image. In this manner, the total pixel intensity is substantially maintained throughout the output image without a substantial loss of resolution. However, individual pixels might be lighter or darker in the resulting image than in the input image.

For example, FIG. 1A depicts grayscale values for neighboring pixels in an input image. Each pixel has a grayscale value within a range. In an computer embodiment having 8-bit color, a low value for the range is "0" and a high value for the range is "255."

FIG. 1B depicts the resulting light/dark values for the four pixels based on a traditional error diffusion method. In FIG. 1B, the threshold for the light/dark determination is the midpoint of the range (i.e., a grayscale value of 127.5). Since the first pixel has a grayscale value greater than the threshold, the pixel is assigned a value of "1" (e.g., "light" or "white"). The difference between the original grayscale value for the first pixel and the resulting high value is defined to be the error value, $E_1$. In other words, the error is equal to the amount of compensation added to a pixel in order to force it to a "0" or "1" value.

For the second pixel, the error value $E_1$ is subtracted from the original value for the pixel. Since the resulting value is less than the threshold, the second pixel is assigned a value of "0" (e.g., "dark"). The error value, $E_2$, is computed for the second pixel. The process iterates over each subsequent pixel until all pixels are computed. Alternate error diffusion methods might diffuse the calculated error among a plurality of unconverted pixels. For example, a first portion of the error value $E_1$ for the first pixel could be subtracted from the second pixel and a second portion could be subtracted from the third pixel.

Exemplary methods of using error diffusion to generate an output image include the methods described in U.S. Pat. Nos. 5,226,094 and 5,374,997 to Eschbach.

One problem inherent in the Floyd-Steinberg method, its progeny and other current error diffusion methods is that error determinations for pixels are performed serially. For image processing hardware in which intensity information for multiple pixels is received in a single time period, the processing of such pixel intensity information must occur at an increased rate to keep pace with the incoming information. For example, if the initial pixel intensity information is received at a rate of 25 MHz and four pixels are received in a clock cycle, a serial error diffusion method must be performed at a rate of 100 MHz in order to retain all data and to keep up with the information stream. As input clock rates and/or the number of pixels for which information is received in a clock cycle increase, the required error diffusion rates can become excessive or impossible to achieve with current serial methods. This is particularly so when information is transferred in an environment in which trace lengths affect the maximum clock rate. Alternatively, processors that perform the computations at the increased rates might not be cost effective for particular applications.

What is needed is a multi-pixel error diffusion method that enables high-speed error diffusion for parallel intensity information.

A need exists for reducing the cost of performing error diffusion for an image.

A need exists for an error diffusion method that operates at the clock rate at which parallel intensity information is received.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "pixel" is a reference to one or more pixels and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In certain embodiments, the present disclosure describes methods and systems for performing multi-pixel one-dimensional parallel error diffusion that enables high-speed error diffusion without increasing the system clock rate. The methods may enable error diffusion to be performed on multiple pixels simultaneously. In general, the data rate of the number of incoming bits times the system clock rate may be achieved if parallel error diffusion is performed on each incoming pixel in each clock cycle.

In an embodiment, a method for performing error diffusion may include receiving a pixel intensity value for each pixel in an ordered set of pixels, receiving an initial error value, and computing a pixel value for each pixel and an updated error value substantially simultaneously. Each pixel intensity value may include a value within a range having a low value and a high value. The pixel values and the updated error value may be computed based on the pixel intensity values and the initial error value.

In an embodiment, computing a pixel value for each pixel and an updated error value may include computing a plurality of comparison values; computing a current threshold equal to an average of the low value and the high value; for each pixel, setting the current comparison value to the comparison value corresponding to the pixel, comparing the current comparison value and the current threshold, and, if the current comparison value exceeds the current threshold, increasing the current threshold by the high value; determining the pixel values for each pixel based on the comparing steps for each pixel; and determining the updated error value. Each comparison value may correspond to a pixel. The comparison value corresponding to a pixel may be equal to a sum of the initial error value and the pixel intensity values for each pixel up to and including the pixel in the ordered set of pixels.

In an embodiment, computing a pixel value for each pixel and an updated error value may include computing an ordered set of comparison values; computing an ordered set of thresholds; and for each pixel, determining whether the comparison value corresponding to the pixel is greater than each of the thresholds in the ordered set of thresholds having a order less than or equal to the order of the comparison value, assigning a high value to the pixel value for the pixel if, for each difference in order between the comparison value corresponding to the pixel and the highest threshold exceeded by the comparison value corresponding to the pixel, a comparison value of lower order than the comparison value corresponding to the pixel is less than a threshold having an order between the threshold exceeded by the comparison value corresponding to the pixel and the first threshold, inclusive, and otherwise, assigning a low value to the pixel value for the pixel. Each comparison value may correspond to a pixel. The comparison value corresponding to a pixel may be equal to a sum of the initial error value and the pixel intensity values for each pixel up to and including the pixel in the ordered set of pixels. The number of thresholds in the ordered set of thresholds may equal the number of pixels in the ordered set of pixels. The first threshold may equal an average of the low value and the high value. Each subsequent threshold may equal the sum of the preceding threshold in the ordered set and the high value.

In an embodiment, a xerographic apparatus, such as, for example, a copier or printer, may be used to perform a described method. In an embodiment, a system for performing error diffusion may include a processor, a processor-readable storage medium in communication with the processor, and a communication interface in communication with the processor. The processor-readable storage medium may contain one or more programming instructions for performing an above-described method.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

Figure 1:
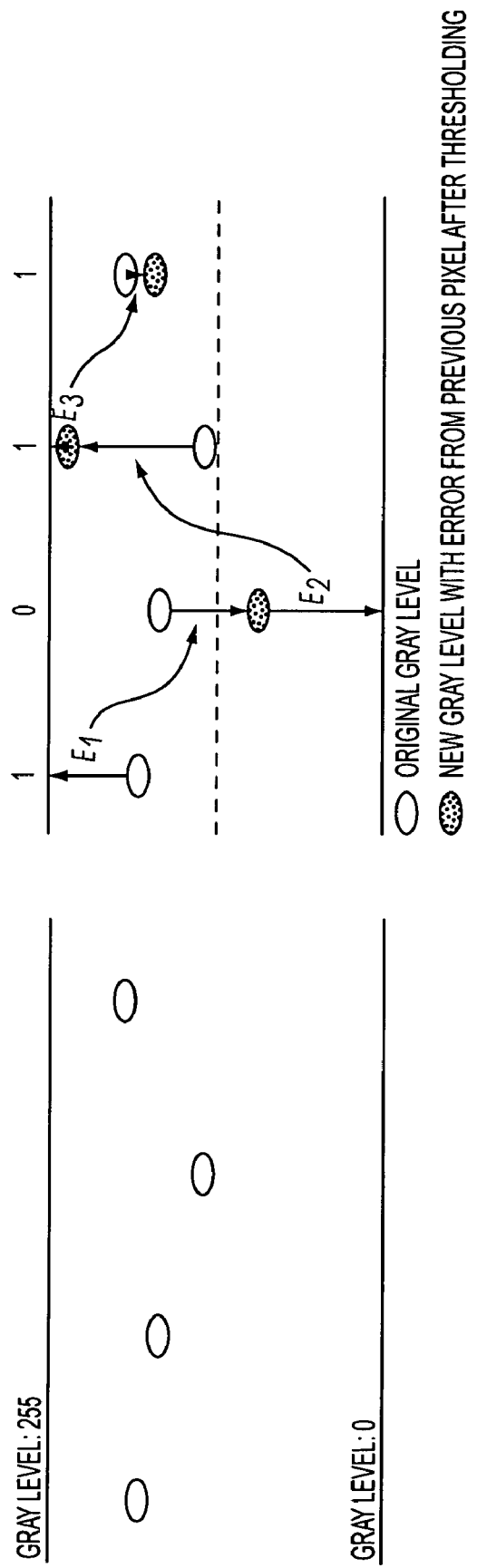
FIG. 1A depicts grayscale levels for neighboring pixels.
FIG. 1B depicts the resulting pixel values using a traditional method of computing error diffusion.
Figure 2:
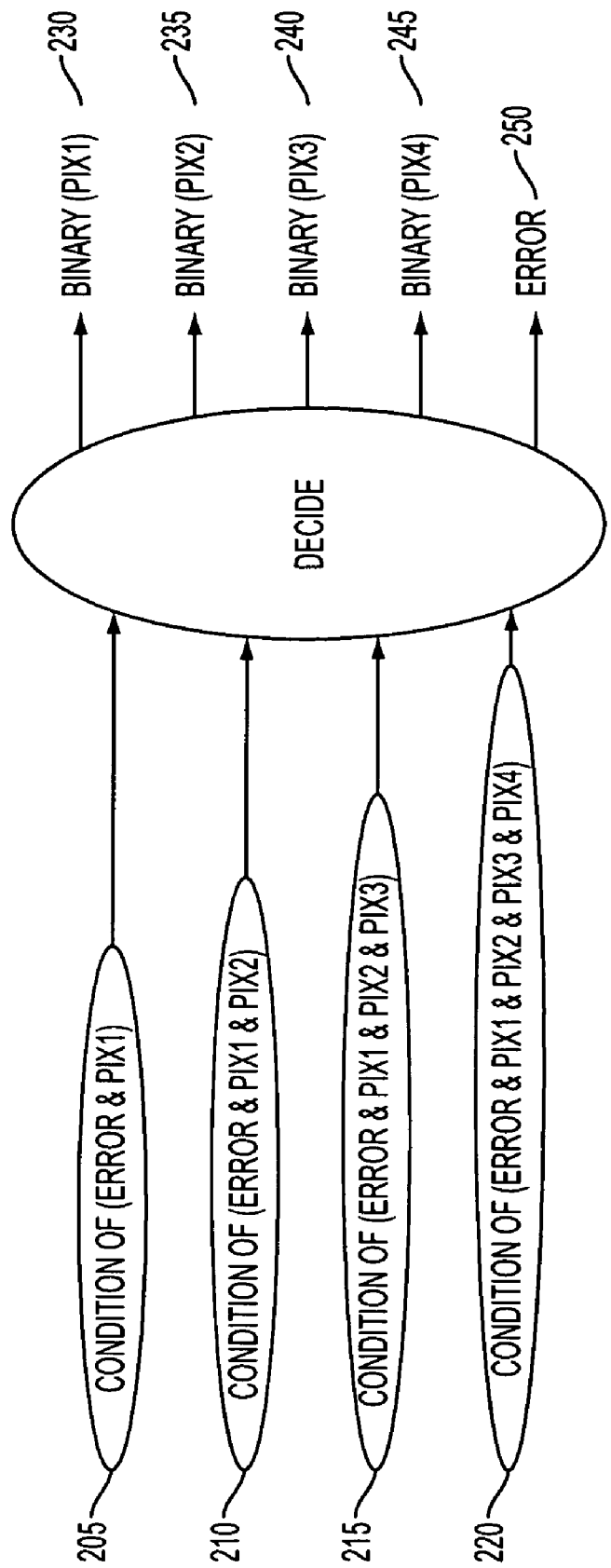
FIG. 2 depicts a high-level illustration of four-pixel parallel error diffusion according to an embodiment.

In an embodiment, a parallel error diffusion method may receive pixel values for a plurality of pixels in a single clock cycle. In addition, an error value may be updated in each cycle based on the pixel values. As shown in FIG. 2, the method may receive values for, for example, four pixels and an initial error value. Inputs may include a condition pertaining to the initial error value and the first pixel intensity value 205; a condition pertaining to the initial error value, the first pixel intensity value and the second pixel intensity value 210; a condition pertaining to the initial error value, the first pixel intensity value, the second pixel intensity value and the third pixel intensity value 215; and a condition pertaining to the initial error value, the first pixel intensity value, the second pixel intensity value, the third pixel intensity value and the fourth pixel intensity value 220. Based on the received information, binary pixel values may be determined for the first pixel 230, the second pixel 235, the third pixel 240 and the fourth pixel 245. These binary pixel values may determine whether the corresponding pixel is dark or light. In addition, an updated error value 250 may be determined. In an embodiment, the updated error value 250 may be used as the initial error value for the next clock cycle. One of skill in the art will understand and recognize that embodiments receiving values for more or less than four pixels are possible using the methods described herein.

Figure 3A:
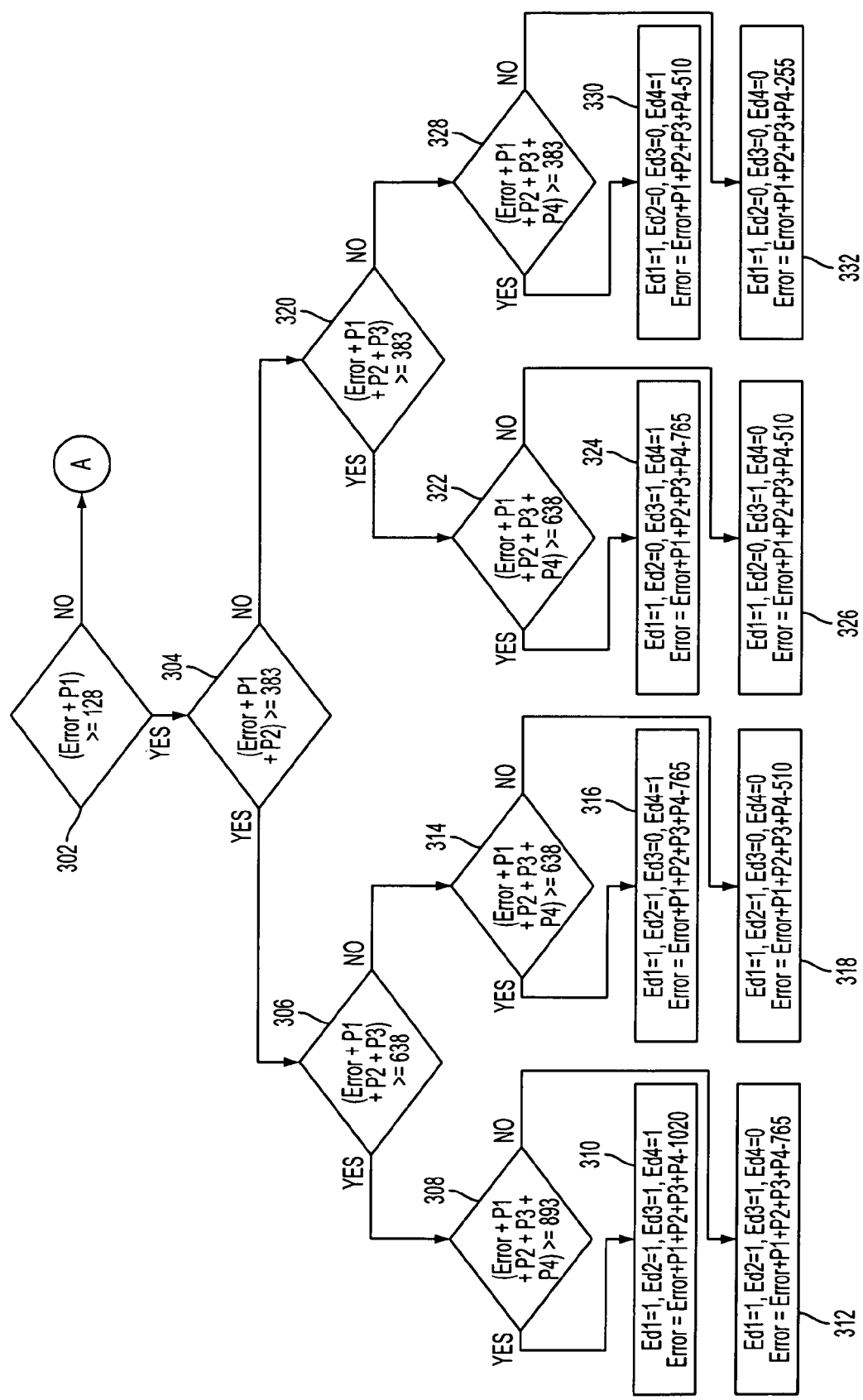
FIGS. 3A and 3B depict flow diagrams for a method of performing four-pixel parallel error diffusion according to an embodiment.
Figure 3B:
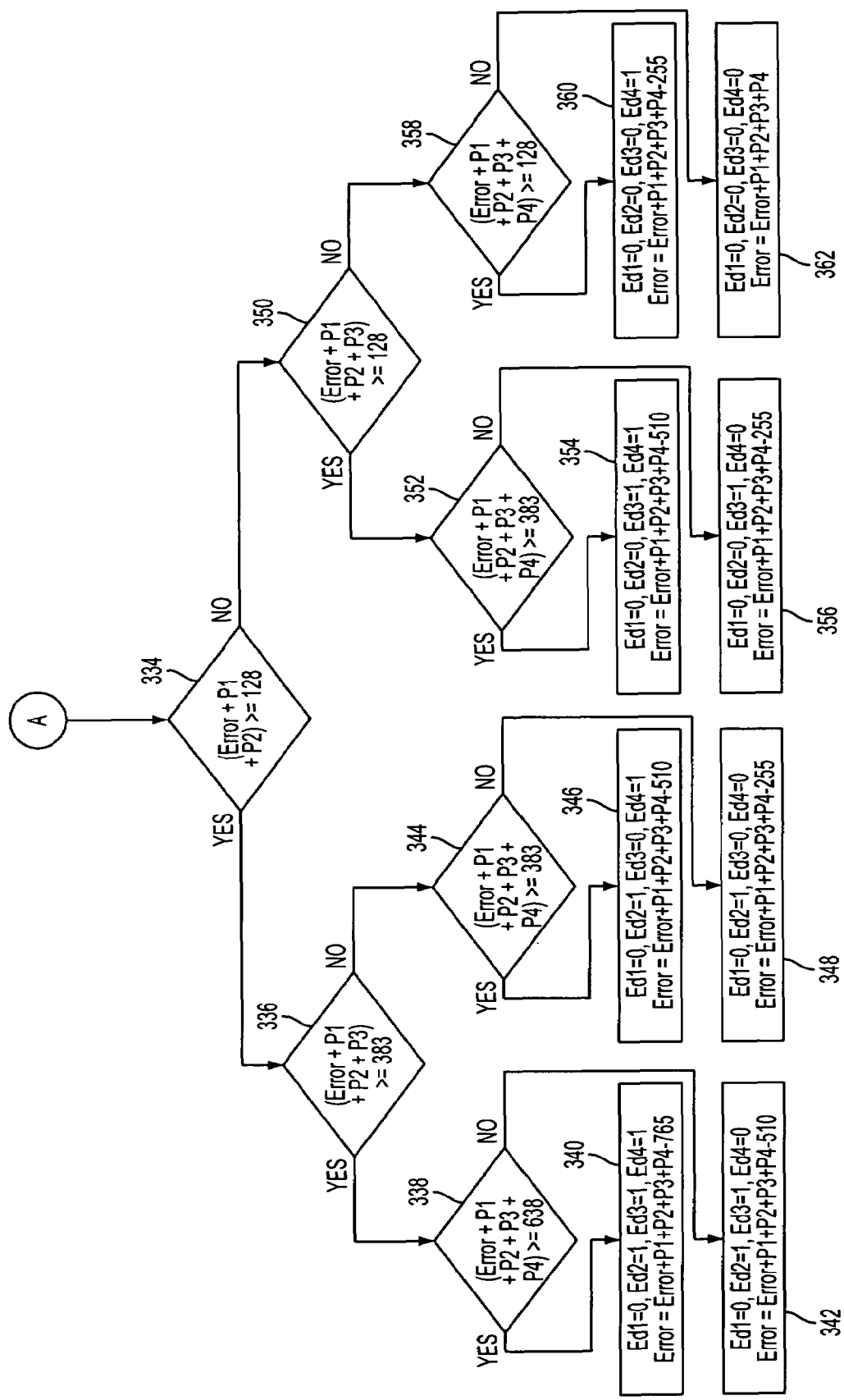

FIGS. 3A and 3B depict flow diagrams for a method of performing four-pixel parallel error diffusion according to an embodiment. The method disclosed in FIGS. 3A and 3B may be extended to handle any number of input pixels enabling implementation of image processing functions in high-performance multi-functional systems. As shown in FIG. 3A, a determination may first be made as to whether the sum of the error value and the first pixel intensity value is greater than or equal to a first threshold 302, such as a midpoint between a low value (such as 0) and a high value (such as 255). If the sum is greater than the first threshold, a determination may be made as to whether the sum of the error value, the first pixel intensity value and the second pixel intensity value is greater than or equal to a second threshold 304. In an embodiment, the second threshold may be equal to the sum of the first threshold and the high value. If the sum is greater than the second threshold, a determination may be made as to whether the sum of the error value, the first pixel intensity value, the second pixel intensity value and the third pixel intensity value is greater than or equal to a third threshold 306. In an embodiment, the third threshold may be equal to the sum of the second threshold and the high value. If the sum is greater than the third threshold, a determination may be made as to whether the sum of the error value, the first pixel intensity value, the second pixel intensity value, the third pixel intensity value and the fourth pixel intensity value is greater than or equal to a fourth threshold 308. In an embodiment, the fourth threshold may be equal to the sum of the third threshold and the high value. If the sum is greater than the fourth threshold, each of the pixel values may be set to "1," and the error value may be set to the sum of the initial error value and each of the pixel intensity values minus four times the high value 310. If the sum is not greater than the fourth threshold, the pixel values for the first, second and third pixels may each be set to "1," the pixel value for the fourth pixel may be set to "0," and the error value may be set to the sum of the initial error value and each of the pixel intensity values minus three times the high value 312.

If the determination in 306 is negative, a determination may be made as to whether the sum of the error value, the first pixel intensity value, the second pixel intensity value, the third pixel intensity value and the fourth pixel intensity value is greater than or equal to the third threshold 314. If the sum is greater than the third threshold, the pixel values for the first, second and fourth pixels may each be set to "1," the pixel value for the third pixel may be set to "0," and the error value may be set to the sum of the initial error value and each of the pixel intensity values minus three times the high value 316. If the sum is not greater than the third threshold, the pixel values for the first and second pixels may each be set to "1," the pixel values for the third and fourth pixels may each be set to "0," and the error value may be set to the sum of the initial error value and each of the pixel intensity values minus two times the high value 318.

If the determination in 304 is negative, a determination may be made as to whether the sum of the error value, the first pixel intensity value, the second pixel intensity value and the third pixel intensity value is greater than or equal to the second threshold 320. If the sum is greater than the second threshold, a determination may be made as to whether the sum of the error value, the first pixel intensity value, the second pixel intensity value, the third pixel intensity value and the fourth pixel intensity value is greater than or equal to the third threshold 322. If the sum is greater than the third threshold, the pixel values for the first, third and fourth pixels may each be set to "1," the pixel value for the second pixel may be set to "0," and the error value may be set to the sum of the initial error value and each of the pixel intensity values minus three times the high value 324. If the sum is not greater than the third threshold, the pixel values for the first and third pixels may each be set to "1," the pixel values for the second and fourth pixels may each be set to "0," and the error value may be set to the sum of the initial error value and each of the pixel intensity values minus two times the high value 326.

If the determination in 320 is negative, a determination may be made as to whether the sum of the error value, the first pixel intensity value, the second pixel intensity value, the third pixel intensity value and the fourth pixel intensity value is greater than or equal to the second threshold 328. If the sum is greater than the second threshold, the pixel values for the first and fourth pixels may each be set to "1," the pixel values for the second and third pixels may each be set to "0," and the error value may be set to the sum of the initial error value and each of the pixel intensity values minus two times the high value 330. If the sum is not greater than the second threshold, the pixel value for the first pixel may be set to "1," the pixel values for the second, third and fourth pixels may each be set to "0," and the error value may be set to the sum of the initial error value and each of the pixel intensity values minus the high value 332.

If the determination in 302 is negative, as shown in FIG. 3B, a determination may be made as to whether the sum of the error value, the first pixel intensity value and the second pixel intensity value is greater than or equal to the first threshold 334. If the sum is greater than the first threshold, a determination may be made as to whether the sum of the error value, the first pixel intensity value, the second pixel intensity value and the third pixel intensity value is greater than or equal to the second threshold 336. If the sum is greater than the second threshold, a determination may be made as to whether the sum of the error value, the first pixel intensity value, the second pixel intensity value, the third pixel intensity value and the fourth pixel intensity value is greater than or equal to the third threshold 338. If the sum is greater than the third threshold, the pixel values for the second, third and fourth pixels may each be set to "1," the pixel value for the first pixel may be set to "0," and the error value may be set to the sum of the initial error value and each of the pixel intensity values minus three times the high value 340. If the sum is not greater than the third threshold, the pixel values for the second and third pixels may each be set to "1," the pixel values for the first and fourth pixels may each be set to "0," and the error value may be set to the sum of the initial error value and each of the pixel intensity values minus two times the high value 342.

If the determination in 336 is negative, a determination may be made as to whether the sum of the error value, the first pixel intensity value, the second pixel intensity value, the third pixel intensity value and the fourth pixel intensity value is greater than or equal to the second threshold 344. If the sum is greater than the second threshold, the pixel values for the second and fourth pixels may each be set to "1," the pixel values for the first and third pixels may each be set to "0," and the error value may be set to the sum of the initial error value and each of the pixel intensity values minus two times the high value 346. If the sum is not greater than the second threshold, the pixel value for the second pixel may be set to "1," the pixel values for the first, third and fourth pixels may each be set to "0," and the error value may be set to the sum of the initial error value and each of the pixel intensity values minus the high value 348.

If the determination in 334 is negative, a determination may be made as to whether the sum of the error value, the first pixel intensity value, the second pixel intensity value and the third pixel intensity value is greater than or equal to the first threshold 350. If the sum is greater than the first threshold, a determination may be made as to whether the sum of the error value, the first pixel intensity value, the second pixel intensity value, the third pixel intensity value and the fourth pixel intensity value is greater than or equal to the second threshold 352. If the sum is greater than the second threshold, the pixel values for the third and fourth pixels may each be set to "1," the pixel values for the first and second pixels may each be set to "0," and the error value may be set to the sum of the initial error value and each of the pixel intensity values minus two times the high value 354. If the sum is not greater than the second threshold, the pixel value for the third pixel may be set to "1," the pixel values for the first, second and fourth pixels may each be set to "0," and the error value may be set to the sum of the initial error value and each of the pixel intensity values minus the high value 356.

If the determination in 350 is negative, a determination may be made as to whether the sum of the error value, the first pixel intensity value, the second pixel intensity value, the third pixel intensity value and the fourth pixel intensity value is greater than or equal to the first threshold 358. If the sum is greater than the first threshold, the pixel values for the fourth pixel may be set to "1," the pixel values for the first, second and third pixels may each be set to "0," and the error value may be set to the sum of the initial error value and each of the pixel intensity values minus the high value 360. If the sum is not greater than the first threshold, the pixel values for each of the pixels may be set to "0," and the error value may be set to the sum of the initial error value and each of the pixel intensity values 362.

Figure 4A:
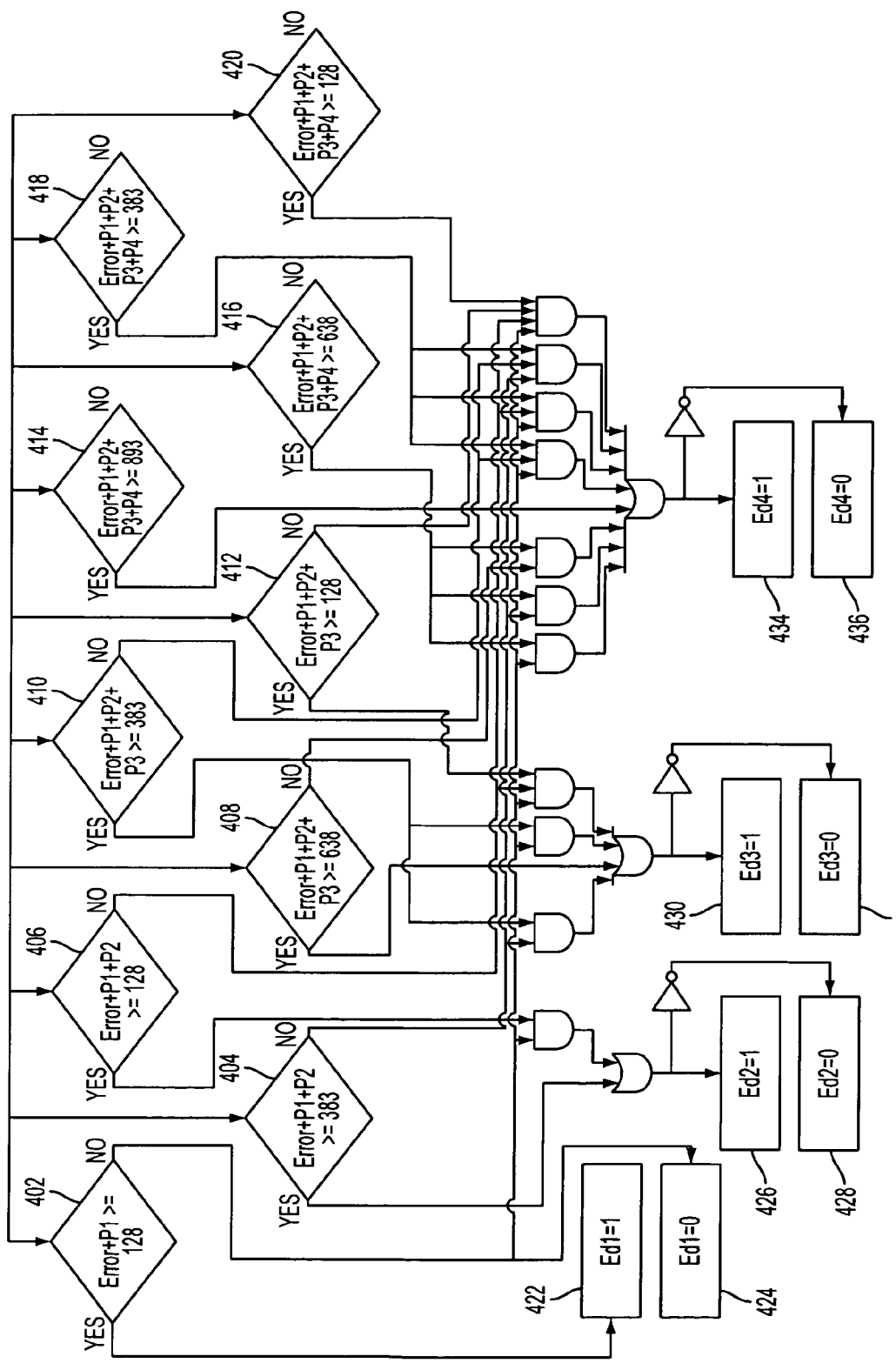
FIGS. 4A and 4B depict flow diagrams for an exemplary method of performing four-pixel parallel error diffusion according to an embodiment.

In an alternate embodiment, as shown in FIG. 4, each of a plurality of determinations may be made simultaneously. For example, for a 4-pixel implementation, determinations of whether the sum of the initial error value and the first pixel intensity value is greater than the first threshold 402; the sum of the initial error value, the first pixel intensity value and the second pixel intensity value is greater than the second threshold 404 and the first threshold 406; the sum of the initial error value, the first pixel intensity value, the second pixel intensity value and the third pixel intensity value is greater than the third threshold 408, the second threshold 410, and the first threshold 412; and the sum of the initial error value, the first pixel intensity value, the second pixel intensity value, the third pixel intensity value and the fourth pixel intensity value is greater than the fourth threshold 414, the third threshold 416, the second threshold 418 and the first threshold 420 are made. In an embodiment, the first threshold may be equal to the average of the low value and the high value for the range of pixel intensity values; the second threshold may be equal to the sum of the first threshold and the high value; the third threshold may be equal to the sum of the second threshold and the high value; and the fourth threshold may be equal to the sum of the third threshold and the high value.

Based on the values returned by the above-listed determinations, the pixel values and the initial error value may be determined. For example, if determination 402 is true, then the first pixel value may be set to "1" 422; otherwise, the first pixel value may be set to "0" 424.

Similarly, if determination 404 is true or determination 402 is false and determination 406 is true, then the second pixel value may be set to "1" 426; otherwise, the second pixel value may be set to "0" 428.

The third pixel value may be set to "1" 430 if determination 408 is true; determination 404 is false and determination 410 is true; determination 402 is false and determination 410 is true; or determination 402 and determination 406 are false and determination 412 is true. Otherwise, the third pixel value may be set to "0" 432.

Likewise, the fourth pixel value may be set to "1" 434 if determination 414 is true; determination 408 is false and determination 416 is true; determination 404 is false and determination 416 is true; determination 404 and determination 410 are false and determination 418 is true; determination 402 is false and determination 416 is true; determination 402 and determination 410 are false and determination 418 is true; determination 402 and determination 406 are false and determination 418 is true; or determination 402, determination 406 and determination 412 are false and determination 420 is true. Otherwise, the fourth pixel value may be set to "0" 436.

The error value may be set to the sum of the initial error value, the first pixel intensity value, the second pixel intensity value, the third pixel intensity value and the fourth pixel intensity value minus an error comparison value. Thus, for the four-pixel embodiment shown in FIG. 4B, the error comparison value may be equal to four times the high value 440 if determination 414 is true; three times the high value 442 if determination 414 is false and determination 416 is true; two times the high value 444 if determination 416 is false and determination 418 is true; the high value 446 if determination 418 is false and determination 420 is true; and zero 448 if determination 420 is false.

The described methods are not limited to the four-pixel embodiments described above. The described methods may be extended to N-pixel embodiments by simply performing additional or fewer determinations. For instance, if the incoming pixel intensity information includes eight pixels per clock cycle, then eight levels of determinations, instead of four, may be performed according to the method of FIGS. 3A and 3B, and thirty-six determinations, instead of ten, may be performed according to the method of FIGS. 4A and 4B.

The embodiments described above, in which values of "1" and "0" are used for binary systems, are non-limiting. Embodiments including additional possible pixel values and/or other values are envisioned within the scope of the present disclosure. In addition, values other than "0" and "1" are also within the scope of the present disclosure. For example, an analog system may be used in place of a digital system. In such an embodiment, the pixel values may be measured in volts instead of in binary values. Other embodiments are also envisioned and within the scope of this disclosure. Similarly, the description of pixel intensity values and/or other values ranging from 0 to 255 is non-limiting. Any range of values for such variables may be implemented within the scope of the present disclosure. Alternate and additional variations will also be envisioned within the scope of the present disclosure by one of skill in the relevant art.

In the case of a color imaging system, a plurality of implementations of either of the described methods may be used. For example, a first implementation may determine whether a pixel includes the color red; a second implementation may determine whether a pixel includes the color green; a third implementation may determine whether a pixel includes the color blue; and a fourth implementation may determine whether a pixel includes the color black. Error values for each of the red, green, blue and black implementations may be diffused to subsequent pixels. Additional or alternate implementations may also be used within the scope of this disclosure.

In an embodiment, the first threshold may be determined by selecting the midpoint between a high value and a low value for a pixel intensity range. A consecutively higher threshold may be determined by adding the current threshold and the high value. In other words, the second threshold may be determined by, for example, adding the first threshold and the high value. The number of thresholds may equal the number of pixels evaluated in a particular clock cycle.

In an embodiment, a xerographic apparatus, such as a digital scanner, facsimile device, copying device, a multi-functional device, and the like may be used to perform the methods described above. Other non-xerographic apparatuses performing similar functions may also perform methods within the scope of the present disclosure.

Figure 5:
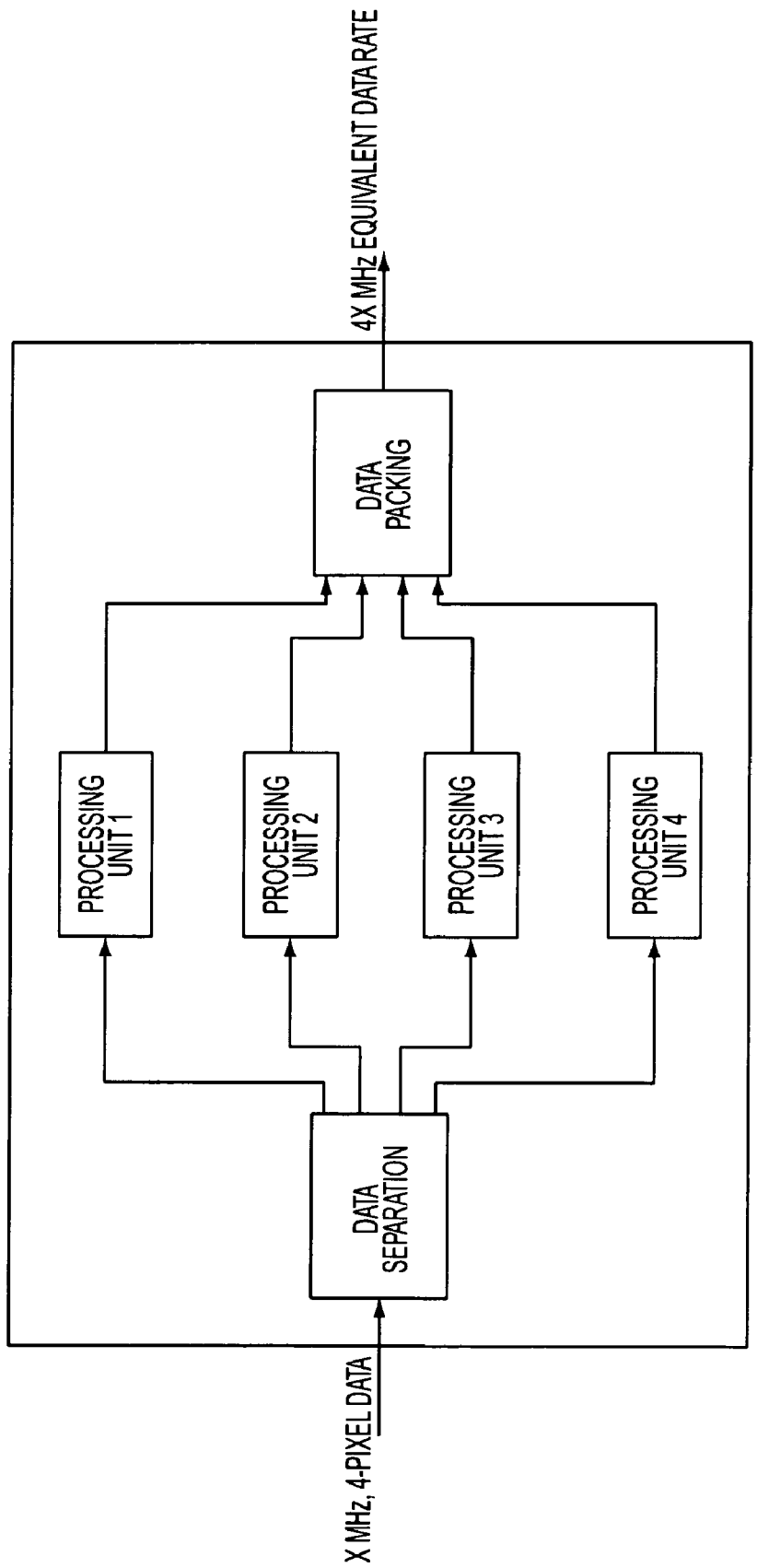
FIG. 5 depicts an exemplary parallel processing system according to an embodiment.

In an embodiment, processing of incoming pixels may be performed in parallel. FIG. 5 depicts an exemplary four-pixel parallel processing system according to an embodiment. As shown in FIG. 5, the input received in a particular clock cycle may include information pertaining to four pixels. For a particular input clock rate, X MHz, the output clock rate may effectively be 4*X MHz in the disclosed embodiment. This may occur because the information for each of the four pixels is handled concurrently.

The architecture depicted in FIG. 5 is exemplary. An N-pixel process may be implemented by including N processing units. Additional or fewer processing units may be included within the system to process other information, such as maintaining an error value within an error diffusion process.

Figure 6B:
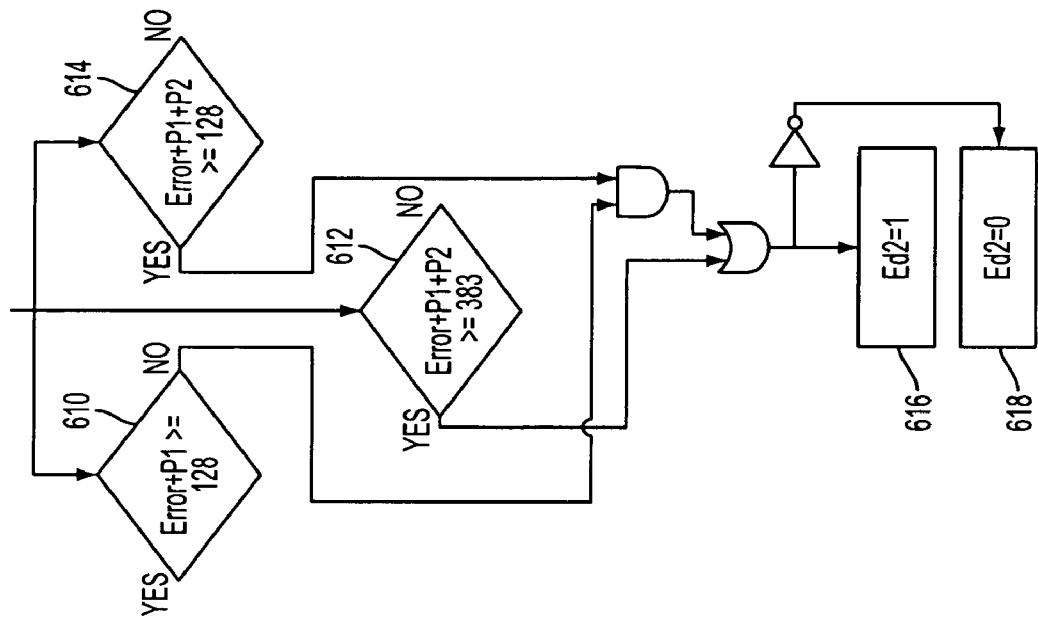
FIG. 6B depicts a flow diagram for an exemplary method of computing a pixel value for a second pixel according to an embodiment.
Figure 6A:
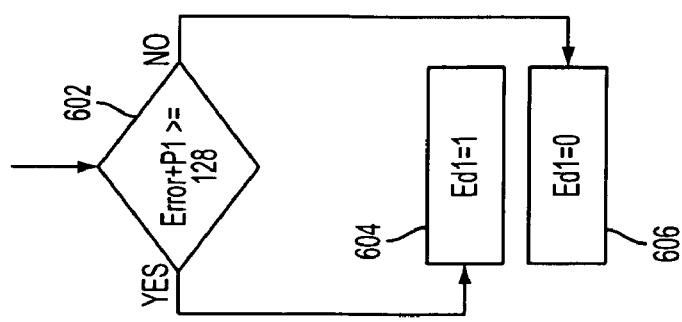
FIG. 6A depicts a flow diagram for an exemplary method of computing a pixel value for a first pixel according to an embodiment.

FIGS. 6A through 6D may depict exemplary error diffusion processing units for a first pixel, a second pixel, a third pixel, and a fourth pixel, respectively, according to an embodiment. As shown in FIG. 6A, a determination of whether the sum of the initial error value and the first pixel intensity value is greater than a first threshold 602 is made. In an embodiment, the first threshold may be equal to the average of the low value and the high value for the range of pixel intensity values. If determination 602 is true, then the first pixel value may be set to "1" 604; otherwise, the first pixel value may be set to "0" 606.

As shown in FIG. 6B, determinations of whether the sum of the initial error value and the first pixel intensity value is greater than the first threshold 610 and whether the sum of the initial error value, the first pixel intensity value and the second pixel intensity value is greater than a second threshold 612 and the first threshold 614 are made. In an embodiment, the second threshold may be equal to the sum of the first threshold and the high value. If determination 612 is true or determination 610 is false and determination 614 is true, then the second pixel value may be set to "1" 616; otherwise, the second pixel value may be set to "0" 618.

Figure 6C:
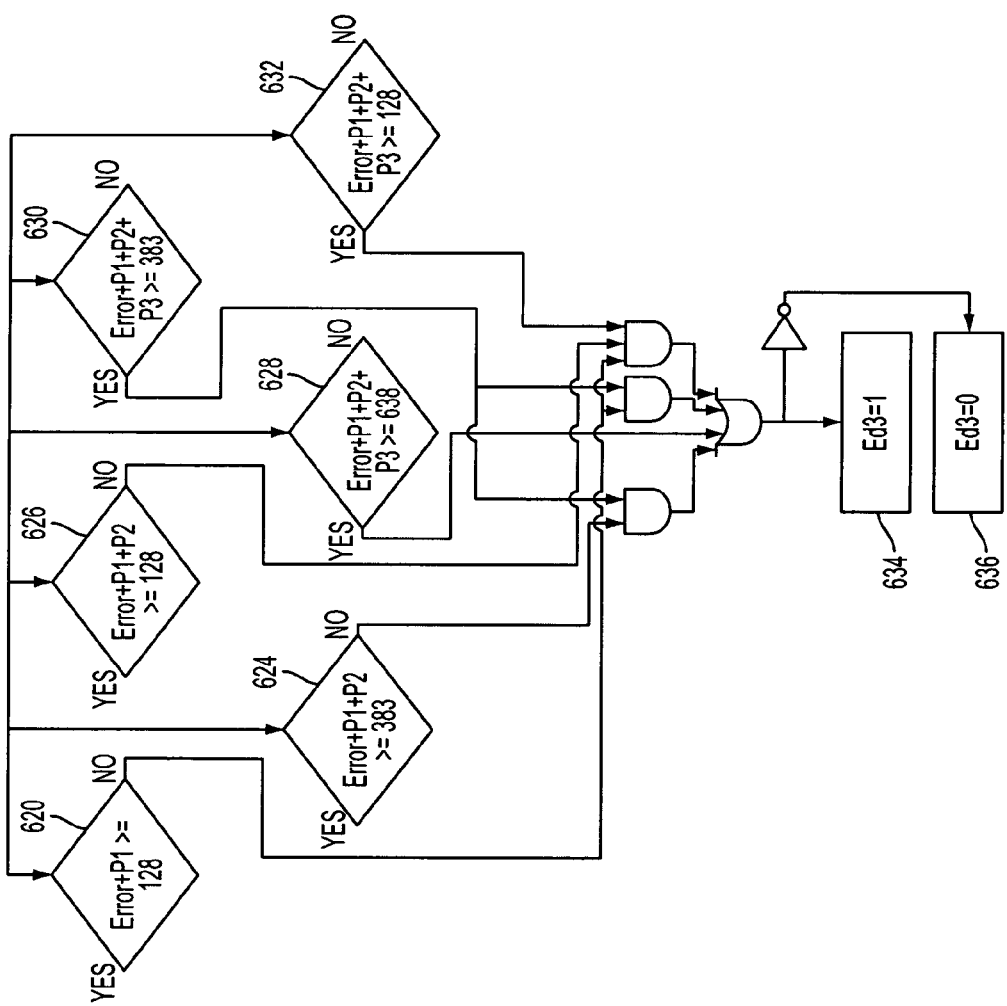
FIG. 6C depicts a flow diagram for an exemplary method of computing a pixel value for a third pixel according to an embodiment.

As shown in FIG. 6C, determinations of whether the sum of the initial error value and the first pixel intensity value is greater than the first threshold 620; whether the sum of the initial error value, the first pixel intensity value and the second pixel intensity value is greater than the second threshold 624 and the first threshold 626; and whether the sum of the initial error value, the first pixel intensity value, the second pixel intensity value and the third pixel intensity value is greater than a third threshold 628, the second threshold 630, and the first threshold 632 are made. In an embodiment, the third threshold may be equal to the sum of the second threshold and the high value. The third pixel value may be set to "1" 634 if determination 628 is true; determination 624 is false and determination 630 is true; determination 620 is false and determination 630 is true; or determination 620 and determination 626 are false and determination 632 is true. Otherwise, the third pixel value may be set to "0" 636.

Figure 6D:
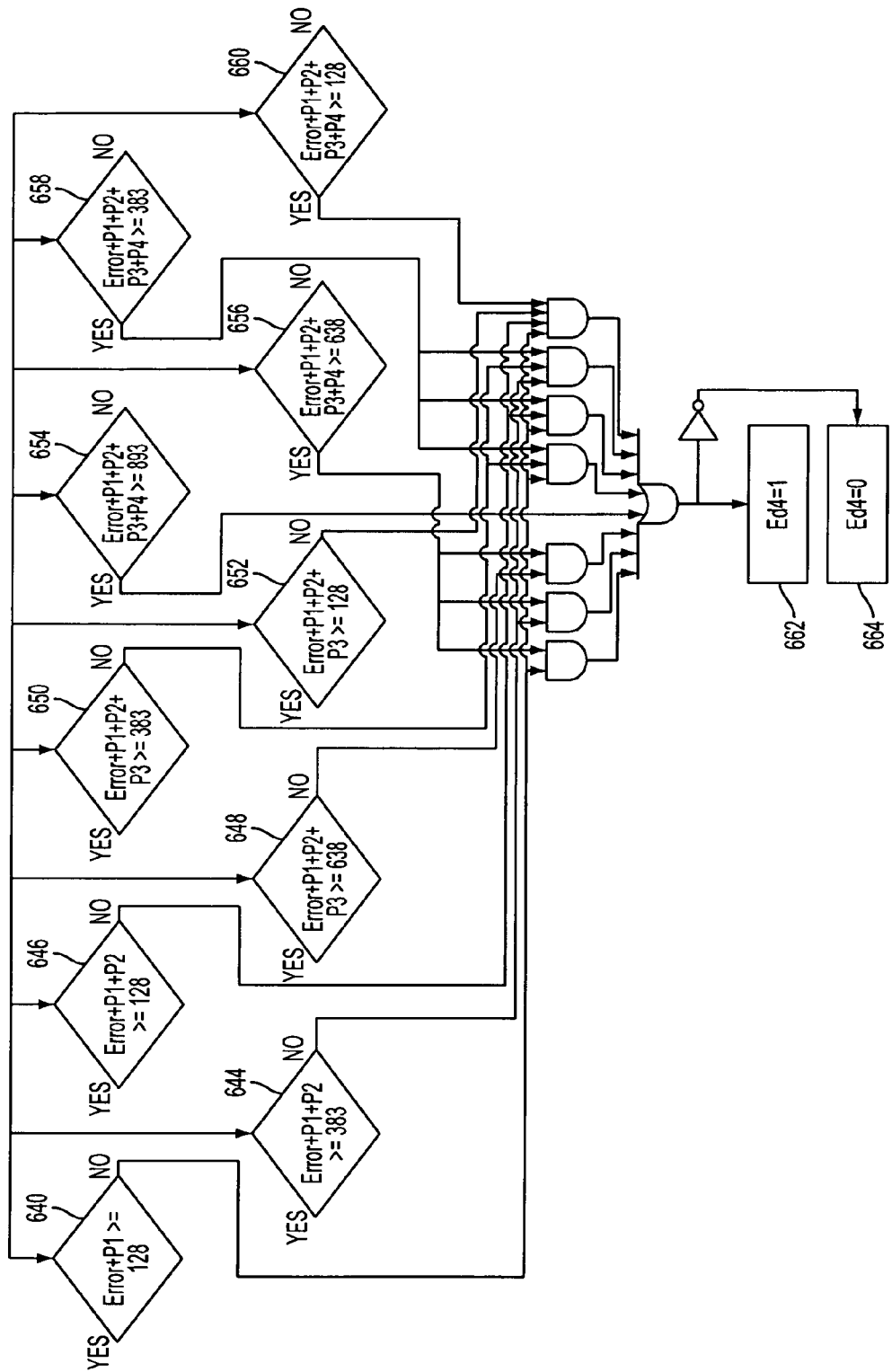
FIG. 6D depicts a flow diagram for an exemplary method of computing a pixel value for a fourth pixel according to an embodiment.

As shown in FIG. 6D, determinations of whether the sum of the initial error value and the first pixel intensity value is greater than the first threshold 640; the sum of the initial error value, the first pixel intensity value and the second pixel intensity value is greater than the second threshold 644 and the first threshold 646; the sum of the initial error value, the first pixel intensity value, the second pixel intensity value and the third pixel intensity value is greater than the third threshold 648, the second threshold 650, and the first threshold 652; and the sum of the initial error value, the first pixel intensity value, the second pixel intensity value, the third pixel intensity value and the fourth pixel intensity value is greater than a fourth threshold 654, the third threshold 656, the second threshold 658 and the first threshold 660 are made. In an embodiment, the fourth threshold may be equal to the sum of the third threshold and the high value. The fourth pixel value may be set to "1" 662 if determination 654 is true; determination 648 is false and determination 656 is true; determination 644 is false and determination 656 is true; determination 644 and determination 650 are false and determination 658 is true; determination 640 is false and determination 656 is true; determination 640 and determination 650 are false and determination 658 is true; determination 640 and determination 646 are false and determination 658 is true; or determination 640, determination 646 and determination 652 are false and determination 660 is true. Otherwise, the fourth pixel value may be set to "0" 664.

Figure 4B:
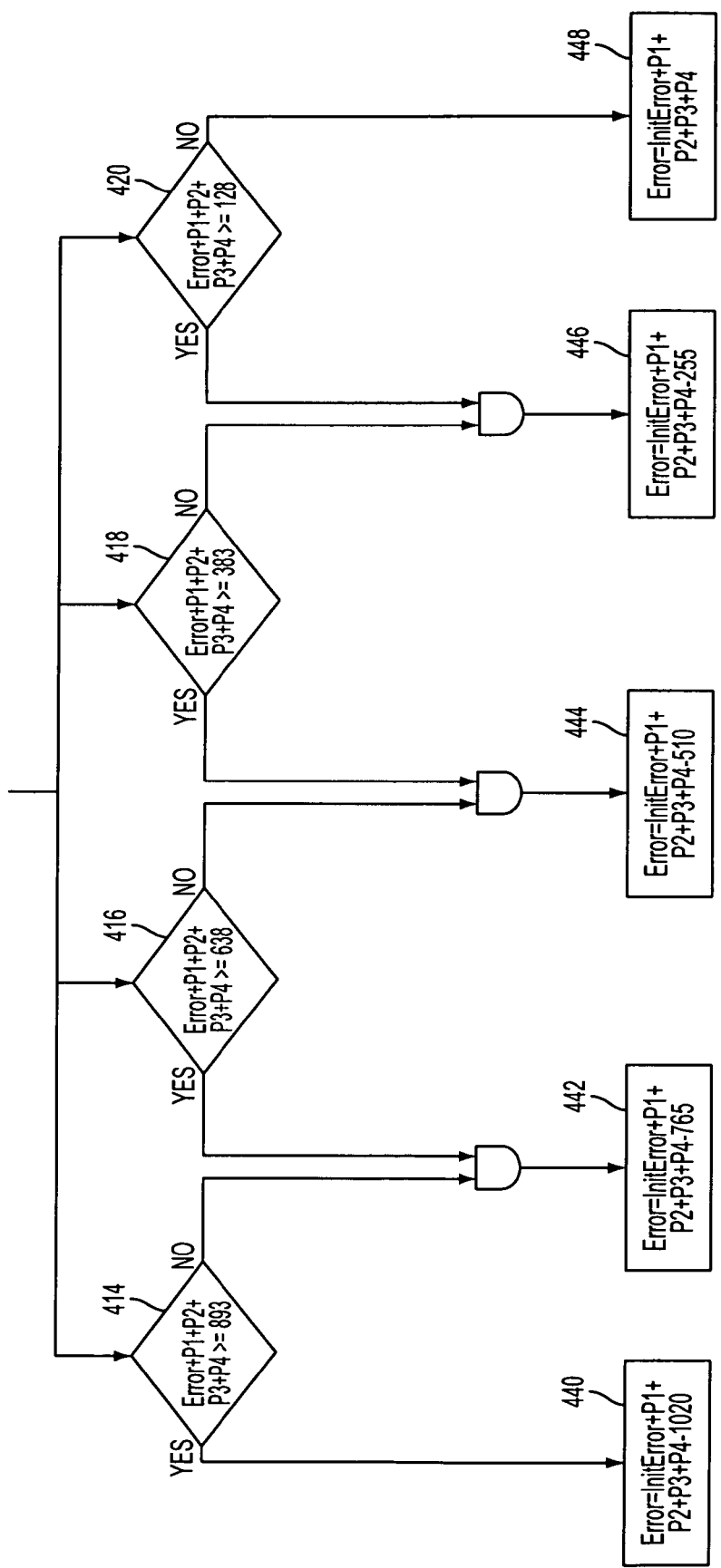

The updated error value may be calculated according to the method described in relation to FIG. 4B.

Figure 7:
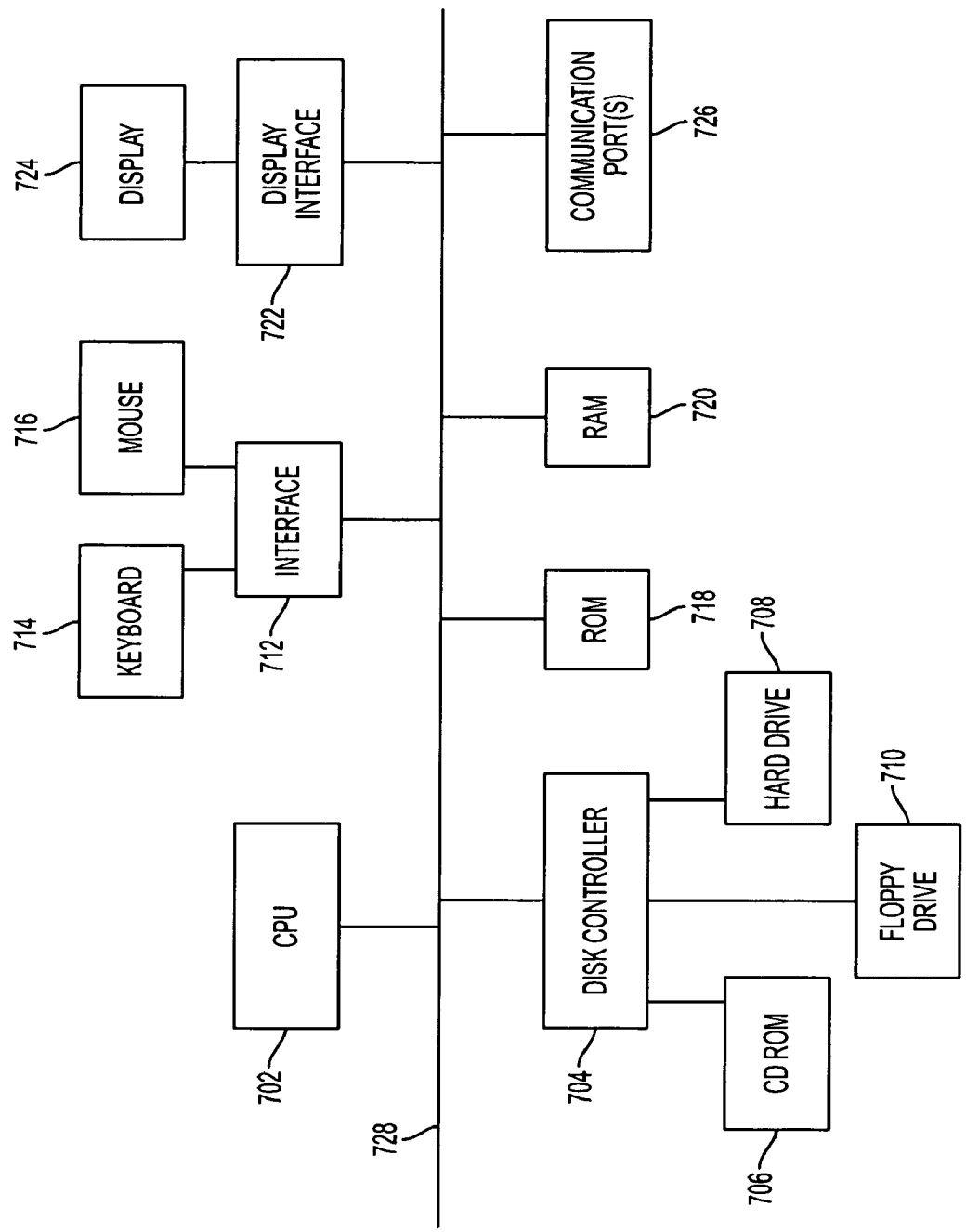
FIG. 7 is a block diagram of exemplary internal hardware that may be used to contain or implement the program instructions according to an embodiment.

FIG. 7 is a block diagram of exemplary internal hardware that may be used to contain or implement the program instructions according to an embodiment. Referring to FIG. 7, a bus 728 serves as the main information highway interconnecting the other illustrated components of the hardware. CPU 702 is the central processing unit of the system, performing calculations and logic operations required to execute a program. Read only memory (ROM) 718 and random access memory (RAM) 720 constitute exemplary memory devices.

A disk controller 704 interfaces with one or more optional disk drives to the system bus 728. These disk drives may be external or internal floppy disk drives such as 710, CD ROM drives 706, or external or internal hard drives 708. As indicated previously, these various disk drives and disk controllers are optional devices.

Program instructions may be stored in the ROM 718 and/or the RAM 720. Optionally, program instructions may be stored on a computer readable medium such as a floppy disk or a digital disk or other recording medium, a communications signal or a carrier wave.

An optional display interface 722 may permit information from the bus 728 to be displayed on the display 724 in audio, graphic or alphanumeric format. Communication with external devices may optionally occur using various communication ports 726. An exemplary communication port 726 may be attached to a communications network, such as the Internet or an intranet.

In addition to the standard computer-type components, the hardware may also include an interface 712 which allows for receipt of data from input devices such as a keyboard 714 or other input device 716 such as a remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for performing error diffusion, the method comprising:
   receiving a pixel intensity value for each pixel in an ordered set of pixels, wherein each pixel intensity value comprises a value within a range, wherein the range comprises a low value and a high value;
   receiving an initial error value;
   a computing using at least one processer, an ordered set of comparison values, wherein each comparison value corresponds to a pixel, wherein the comparison value corresponding to a pixel is equal to a sum of the initial error value and the pixel intensity values for each pixel up to and including the pixel in the ordered set of pixels;

determining a pixel value for each pixel and an updated error value based on the comparison value for each pixel, wherein determining a pixel value for each pixel and an updated error value comprises:

computing an ordered set of thresholds, wherein the number of thresholds in the ordered set of thresholds equals the number of pixels in the ordered set of pixels, wherein the first threshold equals an average of the low value and the high value, wherein each subsequent threshold equals the sum of the preceding threshold in the ordered set and the high value, and for each pixel:

determining whether the comparison value corresponding to the pixel is greater than each of the thresholds in the ordered set of thresholds having a order less than or equal to the order of the comparison value, assigning a high value to the pixel value for the pixel if, for each difference in order between the comparison value corresponding to the pixel and the highest threshold exceeded by the comparison value corresponding to the pixel, a comparison value of lower order than the comparison value corresponding to the pixel is less than a threshold having an order between the threshold exceeded by the comparison value corresponding to the pixel and the first threshold, inclusive, and otherwise, assigning a low value to the pixel value for the pixel; and generating an output image based on the pixel values.

2. The method of claim 1 wherein the ordered set of pixels comprises four pixels.

3. The method of claim 1 wherein the low value for the range is 0, and wherein the high value for the range is 255.

4. The method of claim 1 wherein each pixel value represents coloration for the corresponding pixel of one or more of the following:
one of black and white;
one of cyan and clear;
one of magenta and clear;
one of yellow and clear; and
one of black and clear.

5. A system for performing error diffusion, the system comprising:
a processor;
a processor-readable storage medium in communication with the processor; and
a communication interface in communication with the processor,
wherein the processor-readable storage medium contains one or more programming instructions for performing the following:
receiving, via the communication interface, a pixel intensity value for each pixel in an ordered set of pixels, wherein each pixel intensity value comprises a value within a range, wherein the range comprises a low value and a high value,
receiving an initial error value,
computing an ordered set of comparison values, wherein each comparison value corresponds to a pixel, wherein the comparison value corresponding to a pixel is equal to a sum of the initial error value and the pixel intensity values for each pixel up to and including the pixel in the ordered set of pixels, determining a pixel value for each pixel and an updated error value based on the comparison value for each pixel, wherein determining a pixel value for each pixel and an updated error value comprises:

computing an ordered set of thresholds, wherein the number of thresholds in the ordered set of thresholds equals the number of pixels in the ordered set of pixels, wherein the first threshold equals an average of the low value and the high value, wherein each subsequent threshold equals the sum of the preceding threshold in the ordered set and the high value, and for each pixel:

determining whether the comparison value corresponding to the pixel is greater than each of the thresholds in the ordered set of thresholds having a order less than or equal to the order of the comparison value, assigning a high value to the pixel value for the pixel if, for each difference in order between the comparison value corresponding to the pixel and the highest threshold exceeded by the comparison value corresponding to the pixel, a comparison value of lower order than the comparison value corresponding to the pixel is less than a threshold having an order between the threshold exceeded by the comparison value corresponding to the pixel and the first threshold, inclusive, and otherwise, assigning a low value to the pixel value for the pixel, and generating an output image based on the pixel values.

6. The system of claim 5 wherein the ordered set of pixels comprises four pixels.

7. The system of claim 5 wherein the low value for the range is 0, and wherein the high value for the range is 255.

8. The system of claim 5 wherein each pixel value represents coloration for the corresponding pixel of one or more of the following:
one of black and white;
one of cyan and clear;
one of magenta and clear;
one of yellow and clear; and
one of black and clear.

9. A method for producing an output image by performing error diffusion using a xerographic apparatus, the method comprising:
receiving an input image, wherein the input image comprises a plurality of pixels;
determining a pixel intensity value for each pixel, wherein each pixel intensity value comprises a value within a range, wherein the range comprises a low value and a high value;
ordering the pixels into one or more pixel sets, wherein each pixel set comprises a particular number of pixels;
receiving an initial error value;
for each pixel set:
a computing, using at least one processor, an ordered set of comparison values, wherein each comparison value corresponds to a pixel, wherein the comparison value corresponding to a pixel is equal to a sum of the initial error value and the pixel intensity values for each pixel up to and including the pixel in the pixel set,
determining a pixel value for each pixel in the pixel set and an updated error value based on the comparison value for each pixel and the ordered set of thresholds wherein determining a pixel value for each pixel in the pixel set and an updated error value comprises:

computing an ordered set of thresholds, wherein the number of thresholds in the ordered set of thresholds equals the number of pixels in the pixel set, wherein the first threshold equals an average of the low value and the high value, wherein each subsequent threshold equals the sum of the preceding threshold in the ordered set and the high value, and for each pixel:

determining whether the comparison value corresponding to the pixel is greater than each of the thresholds in the ordered set of thresholds having a order less than or equal to the order of the comparison value, assigning a high value to the pixel value for the pixel if, for each difference in order between the comparison value corresponding to the pixel and the highest threshold exceeded by the comparison value corresponding to the pixel, a comparison value of lower order than the comparison value corresponding to the pixel is less than a threshold having an order between the threshold exceeded by the comparison value corresponding to the pixel and the first threshold, inclusive, and otherwise, assigning a low value to the pixel value for the pixel, and using the updated error value as the initial error value for the next pixel set; and generating an output image based on the pixel values.

10. The method of claim 9 wherein receiving an input image comprises one or more of the following:

scanning the input image; and receiving the input image in an electronic format.

* * * * *